(12) United States Patent
Proefke et al.

(10) Patent No.: US 9,728,018 B2
(45) Date of Patent: Aug. 8, 2017

(54) MEMORY MANAGEMENT FOR FLEET OPERATION OF PEPS VEHICLES

(71) Applicant: GM GLOBAL TECHNOLOGY OPERATIONS LLC, Detroit, MI (US)

(72) Inventors: David T. Proefke, Troy, MI (US); Ron Y. Asmar, West Bloomfield, MI (US); Thomas E. Utter, Royal Oak, MI (US); Aaron P. Creguer, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 189 days.

(21) Appl. No.: 14/622,382

(22) Filed: Feb. 13, 2015

(65) Prior Publication Data
US 2015/0235488 A1 Aug. 20, 2015

Related U.S. Application Data

(60) Provisional application No. 61/940,286, filed on Feb. 14, 2014.

(51) Int. Cl.
*G05B 19/00* (2006.01)
*G07C 9/00* (2006.01)
*H04L 9/08* (2006.01)

(52) U.S. Cl.
CPC ..... *G07C 9/00007* (2013.01); *G07C 9/00309* (2013.01); *H04L 9/0866* (2013.01); *G07C 2009/00365* (2013.01); *G07C 2009/00412* (2013.01); *G07C 2009/00769* (2013.01); *H04L 2209/80* (2013.01); *H04L 2209/84* (2013.01)

(58) Field of Classification Search
CPC ............ G07C 9/00007; G97C 9/00309; H04L 2209/80; H04L 2209/84

USPC ........................................................ 340/5.61
See application file for complete search history.

(56) References Cited

U.S. PATENT DOCUMENTS

2003/0071714 A1 4/2003 Bayer et al.
2005/0035658 A1* 2/2005 Proefke .................. B60R 25/24
307/10.2

FOREIGN PATENT DOCUMENTS

CN 101490721 A 7/2009

OTHER PUBLICATIONS

State Intellectual Property Office of the People'S Republic of China, Office Action in Chinese Patent Application No. 201510094519.5 dated Dec. 23, 2016.

* cited by examiner

*Primary Examiner* — Vernal Brown
(74) *Attorney, Agent, or Firm* — Lorenz & Kopf, LLP

(57) ABSTRACT

Methods and apparatus are provided to dynamically configure a passive entry, passive start system to issue passive and active commands upon authentication of a remote keyless fob with a body control module in a given vehicle selected from a fleet of vehicles. In particular, a UID secret key data field is generated in the FOB data store using a fleet secret key data field and a vehicle secret key field retrieved from the BCM data store. A wakeup pattern data field stored in the FOB data store is generated with a fleet wakeup pattern data field and a master wakeup pattern data field retrieved from the BCM data store such that an approach wakeup pattern data field stored in the BCM data field is written to an approach wakeup pattern data field in the FOB data store when the remote fob is authenticated with the body control module.

18 Claims, 2 Drawing Sheets

MEMORY MANAGEMENT FOR FLEET OPERATION OF PEPS VEHICLES

CROSS-REFERENCE TO RELATED APPLICATIONS

This application claims the benefit of U.S. Provisional Application No. 61/940,286 filed on Feb. 14, 2014. The entire disclosure of the above application is incorporated herein by reference.

TECHNICAL FIELD

The present disclosure generally relates to vehicles having passive entry passive start functionality, and more particularly relates to memory management for implementing PEPS technology for a fleet of vehicles.

BACKGROUND

Vehicles equipped with passive entry, passive start (PEPS) functionality are known in the art. With conventional PEPS systems one or two keyless fobs are associated with a given vehicle. Such PEPS vehicle systems generally include a body control module or BCM in the vehicle which is operable to lock and unlock the vehicle doors, release the truck latch, start-up and turn off the engine, hook the horn and other auxiliary vehicle functions. The body control module is also operable to communicate with the keyless fob which has been authenticated to activate these vehicle functions.

The PEPS system communicates in one of two modes. In a first mode, a passive command is communicated between the keyless fob and the BCM as a LF signal such that a passive entry is enabled simply by lifting the door handle or a passive start is enable by pushing a start button on the instrument panel. Such passive commands require the keyless fob to be in close proximity with the BCM. In a second mode, an active command is communicated between the keyless fob and the BCM as an RF signal such that an active lock/unlock or a remote engine start is enabled by pushing a button on the keyless fob. Such active commands may be carried out when the keyless fob is a substantial distance from the BCM.

For security reasons, the keyless fob and the BCM are statically configured and permanently assigned transceiver IDs which only enable one or two keyless fob to operate a specific vehicle. In other words, remote keyless functions, whether passive or active, are supported on one and only one vehicle. As such, the procedure of associating a new keyless fob with a particular vehicle is complicated and time-consuming. In this way, PEPS-equipped vehicles in, for example, a commercial fleet or police fleet require a specific keyless fob for each vehicle in the fleet. As such, a fleet driver is limited to using the specific fleet vehicle for his or her keyless fob. Moreover, no fob variant exists that allows other vehicles within the fleet to be operated with a given keyless fob.

Accordingly, it is desirable to develop an efficient and secure manner for associating one of several keyless fobs with a BCM in one of several PEPS-equipped vehicles. In addition, it is desirable to configure a single PEPS keyless fob to be fully operational (passive commands, active commands and immobilizer functions) on more than one vehicle. Other desirable features and characteristics of the present disclosure will become apparent from the subsequent detailed description and the appended claims, taken in conjunction with the accompanying drawings and this background.

SUMMARY

An apparatus is provided for a passive entry, passive start (PEPS) system with dynamic memory management between a keyless fob and a BCM in a given vehicle selected from a fleet of vehicles. The PEPS system includes a body control module having a BCM processor and a BCM data store coupled to the BCM processor. The BCM data store has a master secret key data field, a vehicle secret key data field, a fleet secret key data field, an approach wakeup pattern data field, a master wakeup pattern data field, a fleet wakeup pattern data field, a fleet enable data field and a fleet active RFA mode data field. The PEPS system also includes a remote fob having a FOB processor and a FOB data store coupled to the FOB processor. The FOB data store includes a first data region having a master secret key data field, an identification number data field and approach wakeup pattern data field, a second data region having a UID secret key data field and wakeup pattern data field, and a third data region having a UID number data field, an encrypted VIN data field, and an encrypted User Data field.

The fleet secret key data field and the vehicle secret key field in the BCM data store are used to generate the UID secret key data field in the FOB data store. The fleet wakeup pattern data field and the master wakeup pattern data field in the BCM data store are used to generate the wakeup pattern data field stored in the fob data field such that the approach wakeup pattern data field stored in the BCM data field is written to the approach wakeup pattern data field in the FOB data store when the remote fob is authenticated with the body control module.

A method is provided for dynamically configuring a PEPS system to be fully functional to issue passive and active commands upon passive authentication of the keyless fob with the BCM in a given vehicle selected from a fleet of vehicles. In particular, a processor-implemented method for mapping a memory system in a passive entry, passive start system having a body control module including a BCM processor and a BCM data store coupled to the BCM processor and a remote fob having a FOB processor and a FOB data store coupled to the FOB processor is disclosed. In accordance with the method, a UID secret key data field is generated in the FOB data store using a fleet secret key data field and a vehicle secret key field retrieved from the BCM data store. A wakeup pattern data field stored in the FOB data store is generated with a fleet wakeup pattern data field and a master wakeup pattern data field retrieved from the BCM data store such that an approach wakeup pattern data field stored in the BCM data field is written to an approach wakeup pattern data field in the FOB data store when the remote fob is authenticated with the body control module.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
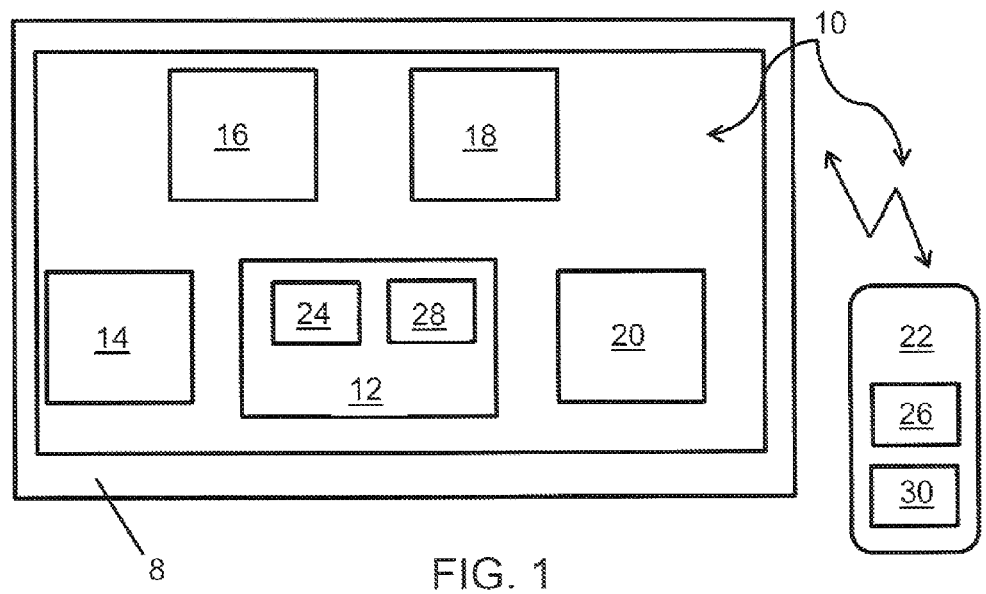
FIG. 1 is a block schematic showing a PEPS system having a BCM and a set of keyless fobs.

With reference FIG. 1, a vehicle 8 having a passive entry, passive start (PEPS) system 10 is schematically shown to include a body control module or BCM 12 and a keyless fob 22. The BCM 12 is operable to a door lock function 14 for locking and unlocking the vehicle doors, a trunk release function 16 for unlatching the truck lock, an engine start function 18 for starting the engine, and a horn function 20 for beeping the horn. The BCM 12 may be configured to operate other auxiliary vehicle functions, e.g., seat heaters, vehicle lights, seat position, etc. The BCM 12 is also operable to wireless communicate with the keyless fob 22 for activating certain vehicle functions. Both the BCM 12 and the keyless fob 22 have data memory—BMC memory module 24 and fob memory module 26 respectively—which are used to store system identification information and synchronization information for enabling PEPS system functionality.

The BCM 12 includes circuitry 28 which is capable of wirelessly communicating with circuitry 30 in the keyless fob 22. Circuitry 28, 30 are conventional for current PEPS systems and capable of communicating in at least two modes. In a first passive mode, a passive command is communicated between the BCM 12 and the keyless fob 22 as a low frequency or LF signal. As used herein an LF signal is generally known in the art to be a data signal having a carrier frequency in the range of 30-300 kHz and typically on the order of about 125 kHz. Passive commands require the keyless fob 22 to be in close proximity with the BCM 12. In response to a passive challenge the BCM 12 interrogates or polls the area immediately around the vehicle using the LF signal to detect the keyless fob 22. When the keyless fob 22 receives and authenticates the polling signal, a passive command signal will be issued to the BCM 12 for performing a particular function. Typically, passive challenges include a passive entry command for unlocking a door that is enabled by lifting the door handle, a passive trunk release that is enabled by pushing a trunk release button or a passive start command for starting the engine when a start button on the instrument panel is push.

In a second active mode, an active command is communicated between the keyless fob 22 and the BCM 12 as a radio frequency or RF signal. As used herein an RF signal is generally known in the art to be a data signal having a carrier frequency in the range of 300-500 MHz. Active commands are issued in response to pushing a button on the keyless fob 22. Typically, the active commands include an active lock command for locking a door, an active unlock command for unlocking the door, an active remote start command for starting the engine, an active trunk release command for opening the trunk and an alert command for repeatedly honking the horn. Because the active commands are issued as an RF signal, they may be carried out when the keyless fob 22 is a substantial distance from the BCM 12.

Figure 2:
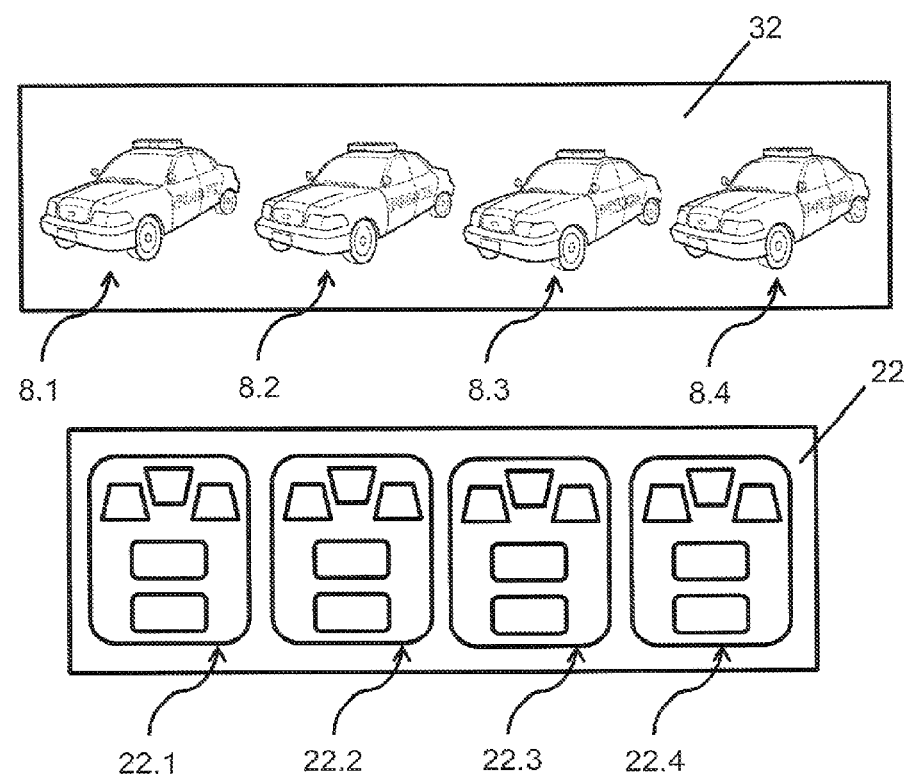
FIG. 2 illustrates a vehicle fleet which may be authenticated to one of several keyless fobs.

As illustrated in FIGS. 1 and 2, a PEPS system 10 for a fleet vehicle configuration in which a keyless fob 22 may be selected from a set of keyless fobs 22.1, 22.2, 22.3 22.4 and dynamically configured with the BCM 12 in a given vehicle 8 selected from a fleet of vehicles 8.1, 8.2, 8.3, 8.4, using passive authentication of the PEPS system 10. Each BCM 12 is calibrated with a unique vehicle ID or VID in BCM memory module 24, and each keyless fob 22 is calibrated with a unique stored transmitter ID or STID in fob memory module 26. The VID and STID are used to dynamically configure a functional transmitter ID or UID in the keyless fob 22 which corresponds with a UID calibrated in the BCM of every fleet vehicle. In this way, conventional remote keyless entry functionality can be securely performed on the BCM 12 in the last vehicle used with which the keyless fob 22 was successfully authenticated.

Figure 3:
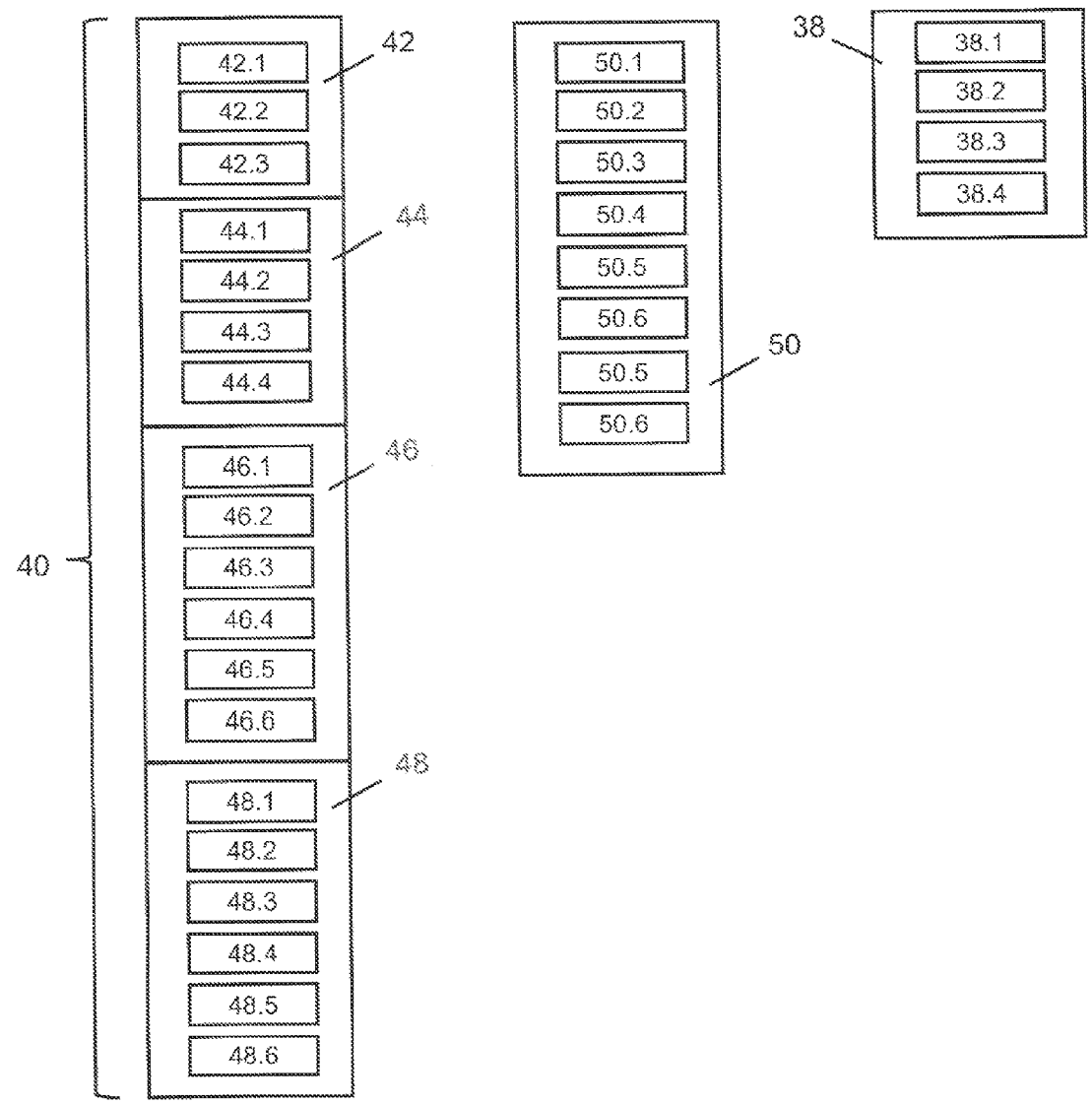
FIG. 3 is a schematic illustration showing the memory mapping between a BCM calBOM data store, a keyless FOB data store and a BCM data store.

With reference now to FIG. 3, a memory map for three discrete memory modules or data stores are illustrated—a BCM CalBOM data store 38, the keyless FOB data store 40, and the BCM data store 50. The BCM CalBOM 38 is memory that resides at a secure location such as an OEM or authorized PEPS system calibration facility. The keyless FOB data store 40 resided in the memory module 26 for the remote fob 22 as shown in FIG. 1. The BCM data store 50 resided in the memory module 24 for the body control module 12 as shown in FIG. 1. As presently preferred a combination of BCM calibrations and randomly generated data values, OEM-specific constants and keyless fob memory page security strategies are used to implement the fleet vehicle functionality in an otherwise conventional hardware for a PEPS systems. As such, the present memory management strategy supports reuse of previously programmed keyless fobs, a single key configuration as a "master" or "fleet" key or a "master" key for two different customer vehicles. In addition, the memory management strategy allows for secure storage of VIN, odometer and other user data and unsecured reading of stored VIN, odometer and other user data.

The BCM CalBOM memory 38 has at least four data block for storing the following data: Fleet Enable 38.1, Fleet Secret Key 38.2, Fleet Wakeup Pattern 38.3, and Fleet Active RFA Mode 38.4. The BCM memory 50 has at least eight data block for storing the following data: Master Secret Key 50.1, Vehicle Secret Key 50.2, Fleet Secret Key 50.3, Approach Wakeup Pattern 50.4, Master Wakeup Pattern 50.5, Fleet Wakeup Pattern 50.6, Fleet Enable 50.7 and Fleet Active RFA Mode 50.8.

The keyless fob memory 40 has four data regions 42-48 with different read/write limitations for securing the data storage and access. As noted below, the second, third and fourth data regions 44-48 may include data fields for two or more vehicles. By providing data fields for two or more vehicles, a pair of keyless fobs could be used with a pair of vehicles, for example in a "family fleet" application.

The first and second data region 42, 44 have denied read, ciphered write functionality. The first data region 42 stores the following data: Master Secret Key 42.1, Identification Number 42.2, and Approach Wakeup Pattern 42.3. The second data region 44 stores at least the following data: UID Secret Key 44.1 and Wakeup Pattern 44.1 for a first vehicle. If the keyless fob 22 will be enable for use with additional vehicles, the second data region 44 will also include a UID Secret Key 44.3 and Wakeup Pattern 44.4 for each additional vehicle.

The third data region 46 has plain read, ciphered write functionality and stores at least the following data: UID Number 46.1, Encrypted VIN 46.2, and Encrypted User Data 46.3. Again, if the keyless fob 22 will be enable for use with additional vehicles, the third data region 46 will also include UID Number 46.4, Encrypted VIN 46.5, and Encrypted User Data 46.6 for each additional vehicle.

The fourth data region 48 has plain read, denied write functionality and stores at least the following data: Plain Read UID Number 48.1, Plain Read VIN 48.2, and Plain Read User Data 48.3. Again, if the keyless fob 22 will be enable for use with additional vehicles, the fourth data region 48 will also include Plain Read UID Number 48.4, Plain Read VIN 48.5, and Plain Read User Data 48.6 for each additional vehicle.

The above-described data structure provides functionality not found in conventional PEPS systems. Fleet Enable data 38.1 is used to enable fleet functionality for the PEPS system. The Master Secret Key data 42.1 and 50.1 stored in FOB data store 40 and the BCM memory module or data store 50, is common to a particular OEM and is used for encryption so that no data is sent in the clear. The Fleet Secret key 38.2 is written from the BCM Cal BOM 38 to the Fleet Secret Key 50.3 in the BCM data store 50 and is used in conjunction with the Vehicle Secret Key 50.2 to generate a UID Secret Key 44.1 in FOB data store 40. Similarly, the Fleet Wakeup Pattern 38.3 is written from the BCM CalBOM 38 to the Fleet Wakeup Pattern 50.6 in the BCM data store 50 and is used in conjunction with the Master Wakeup pattern 50.5 in the BCM data store 50 to generate the Wakeup Pattern 44.2 stored in FOB data store 40. The Approach Wakeup Pattern 50.4 stored in BCM data store 50 is written to the Approach Wakeup Pattern 42.3 in FOB data store 40 when the fob 22 is authenticated with a fleet BCM 12.

The third data region 46 of FOB data store 40 is reprogrammed based on vehicle authentication. In particular, the BCM Fleet Enable 50.7 is used to place the FOB data store 40 in learn mode so that the fob 22 and the BCM 12 may be matched. A UID is generated by the fob 22 and used as the functional transmitter ID for the authenticated BCM 12. The Fleet Active RFA mode 50.8 is used to enable active command functionality for the authenticated fob/BMC combination. The User Data field 46.3, 46.6 in the third data region 46 of FOB data store 40 is sent encrypted from the BCM 12 to the fob 22 and moved or coped to the Plain Read User Data field 48.3, 48.6 in the fourth data region 48 where it is available for reading by an external tool (not shown). The User Data field 46.3, 46.6 in the third data region 46 is stored for the last two vehicles authenticate with the particular fob.

In the data structure and memory management described above BCM calibration defines a secret key value and the LF wakeup value when the fleet calibration is true. BCM calibration also defines the active keyless entry operation mode when the fleet calibration is true. In this way common keyless fob hardware can be used for fleet and retail usage with PEPS system configuration occurring at OEM assembly. The vehicle data to be stored in the keyless fob may be encrypted with a unique (retail) or fleet secret key prior to being written using a common secret key to key memory. Software within the keyless fob 22 decrypts stored vehicle data and writes it to the plain read data regions where it may be read free and clear but may not be overwritten. Lastly, the calibration values for fleet configurations are encrypted prior to storing in BCM CalBOM to deter unauthorized calibration and use.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented method for mapping a memory system in a passive entry, passive start system having a body control module including a BCM processor and a BCM data store coupled to the BCM processor and a remote fob having a FOB processor and a FOB data store coupled to the FOB processor, the method comprising:
   generating a UID secret key data field in the FOB data store using a fleet secret key data field and a vehicle secret key field retrieved from the BCM data store; and
   generating a wakeup pattern data field stored in the FOB data field with a fleet wakeup pattern data field and a master wakeup pattern data field retrieved from the BCM data store such that an approach wakeup pattern data field stored in the BCM data field is written to an approach wakeup pattern data field in the FOB data store when the remote fob is authenticated with the body control module for dynamically configuring a functional transmitter ID in the body control module and the remote fob to enable operation of the passive start, passive entry system.

2. The method of claim 1 further comprising reprogramming a third data region of FOB data store when the remote fob is authenticated with the body control module.

3. The method of claim 1 further comprising placing the FOB data store in a learn mode using a BCM Fleet Enable data field retrieved from the BCM data store for matching the remote fob and the body control module.

4. The method of claim 1 further comprising generating a functional transmitter ID with the remote fob and issuing the functional transmitter ID to the body control module for authenticating the remote fob with the body control module as an authenticated FOB/BCM pair.

5. The method of claim 4 further comprising enabling an active command functionality using a Fleet Active RFA mode data field for the authenticated FOB/BCM pair.

6. The method of claim 1 further comprising encrypting a User Data field in a third data region of BCM data store and sending the encrypted User Data field to the FOB data store.

7. The method of claim 1 further comprising moving or copying an encrypted User Data field in the FOB data store to a Plain Read User Data field in a fourth data region of the FOB data store and configuring the Plain Read User Data field to be read by an external tool.

8. A passive entry, passive start system comprising:
   a body control module having a BCM processor and a BCM data store coupled to the BCM processor, the BCM data store having a master secret key data field, a vehicle secret key data field, a fleet secret key data field, an approach wakeup pattern data field, a master wakeup pattern data field, a fleet wakeup pattern data field, a fleet enable data field and a fleet active RFA mode data field;

a remote fob having a FOB processor and a FOB data store coupled to the FOB processor, the FOB data store having:
- a first data region including a master secret key data field, an identification number data field and approach wakeup pattern data field;
- a second data region including UID secret key data field and wakeup pattern data field; and
- a third data region including UID number data field, an encrypted VIN data field, and an encrypted User Data field;

wherein the fleet secret key data field and the vehicle secret key field in the BCM data store are used to generate the UID secret key data field in the FOB data store; and wherein the fleet wakeup pattern data field and the master wakeup pattern data field in the BCM data store are used to generate the wakeup pattern data field stored in the fob data field such that the approach wakeup pattern data field stored in the BCM data field is written to the approach wakeup pattern data field in the FOB data store when the remote fob is authenticated with the body control module for dynamically configuring a functional transmitter ID in the body control module and the remote fob to enable operation of the passive start, passive entry system.

9. The passive entry, passive start system of claim 8 wherein the third data region of FOB data store is re-programmable when the remote fob is authenticated with the body control module.

10. The passive entry, passive start system of claim 8 further comprising a BCM Fleet Enable data field in the BCM data store for placing the FOB data store in learn mode to match the remote fob and the body control module.

11. The passive entry, passive start system of claim 8 wherein the fob is configured to generate the UID using as the functional transmitter ID for authenticating the body control module as an authenticated FOB/BCM pair.

12. The passive entry, passive start system of claim 11 further comprising a Fleet Active RFA mode data field for enabling an active command functionality for the authenticated FOB/BCM pair.

13. The passive entry, passive start system of claim 8 further comprising an Encrypted User Data field in the FOB data store configured to store encrypted from a User Data field in the third data region in the BCM data store of the body control module.

14. The passive entry, passive start system of claim 13 further comprising a Plain Read User Data field in the fourth data region of the FOB data store, wherein the Encrypted User Data field in the FOB data store is configured to be decrypted and moved or copied to the Plain Read User Data field for retrieval by an external tool.

15. The passive entry, passive start system of claim 8 further comprising wherein the first and second data region of the FOB data store have denied read, ciphered write functionality.

16. The passive entry, passive start system of claim 8 further comprising wherein the third data region has plain read, ciphered write functionality.

17. The passive entry, passive start system of claim 8 further comprising wherein the fourth data region has plain read, denied write functionality.

18. The passive entry, passive start system of claim 8 further comprising a calBOM data store having a Fleet Enable data field and a Fleet Secret key data field, wherein the Feet Secret key data field is written from the Cal BOM data store to the Fleet Secret Key data field in the BCM data store for generating a UID Secret Key data field in FOB data store.

* * * * *